Sept. 1, 1953 J H. BOWEN, JR., ET AL 2,650,493
DURABILITY TEST DEVICE
Filed April 28, 1950

INVENTOR.
J. HARTLEY BOWEN JR.
BY PHILIP A. GELBER

Roderick B. Jones
ATTORNEYS

Patented Sept. 1, 1953

2,650,493

UNITED STATES PATENT OFFICE 2,650,493

DURABILITY TEST DEVICE

J. Hartley Bowen, Jr., Haddonfield, N. J., and Philip A. Gelber, Drexel Hill, Pa.

Application April 28, 1950, Serial No. 158,874

9 Claims. (Cl. 73—7)

(Granted under Title 35, U. S. Code (1952), sec. 266)

The invention described herein may be manufactured and used by or for the Government of the United States of America for governmental purposes without the payment of any royalties thereon or therefor.

The present invention concerns a testing machine and process and particularly concerns a machine for testing durability of non-rigid materials such as laminated foil barriers, plastic sheetings, and papers used in packaging and coated or impregnated fabrics.

In testing materials such as laminated foil barriers used in packaging, it is necessary to simulate actual operational conditions such as rough handling, flexing and crumpling. Conventionally the material is crumpled by hand but this is unsatisfactory because no two individuals crumple a sheet in the same manner and it is almost impossible for an individual to crumple different sheets in the same manner. Tests performed by crumpling the material by hand do not furnish reproducible results.

The present invention overcomes these difficulties by providing a machine that subjects a test specimen to a repeated cycle of twisting, flexing, and crumpling. The specimen may take any shape from a flat sheet to a tube having any geometrical cross section, a cylindrical-tube specimen being preferred. If a tubular specimen is used, the tube can be made by sealing two edges of the specimen together by means of adhesives, tape, or heat sealing, where applicable, or the tube can be left open at the longitudinal seam. The specimen is secured to the two heads of the machine by suitable means such as clamps. One head is moved toward the other with a twisting, pushing motion. This results in alternate crushing and stretching of the specimens during simultaneous twisting thereof.

An object of this invention is to provide a durability testing machine for non-rigid materials such as barrier material used in packaging to determine the handling and flexing properties of the material.

Another object is to provide a machine in which a specimen, preferably cylindrical, is mounted by suitable means to two heads, one of which moves toward and away from the other during simultaneous rotary motion of one head.

Another object is to provide a testing machine having two heads with suitable guide means for rotating one head in relation to the other with means for moving one head toward and away from the other while rotating.

Further objects and advantages of this invention will be readily appreciated as the same become better understood by reference to the following detailed description when considered in connection with the accompanying drawings wherein.

Figure 1:
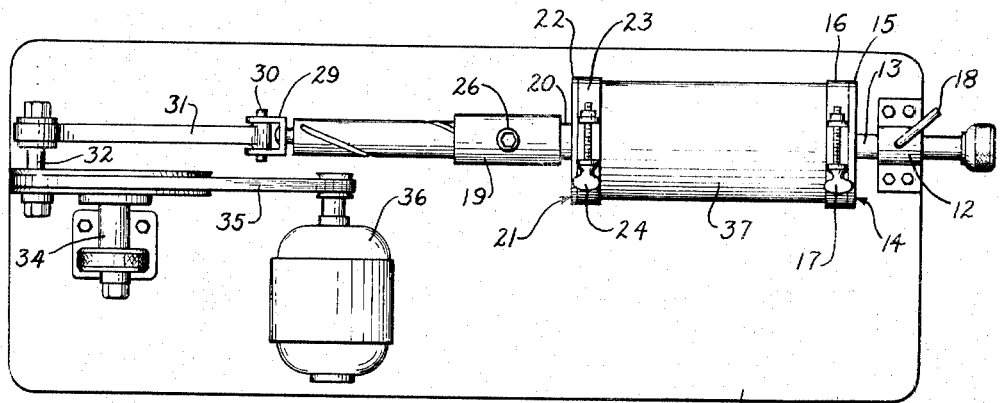
Fig. 1 is a plan view of a preferred embodiment of the invention in which the specimen is shown in stretched position.
Figure 3:
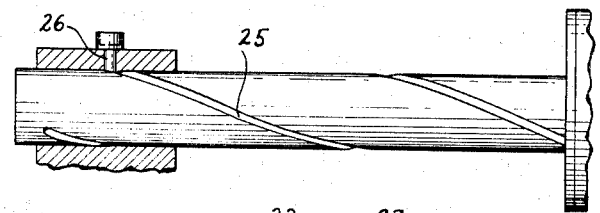
Fig. 3 is an enlarged fragmentary view of an enlarged scale of a suggested method of guiding the movable head by means of a pin and groove construction.
Figure 4:
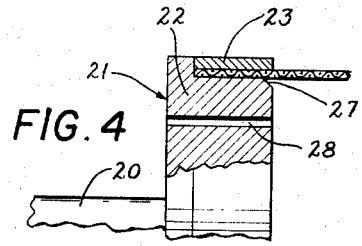
Fig. 4 is an enlarged fragmentary view showing one method of attaching the specimen to the heads of the machine, that is by the use of clamps.
Figure 2:
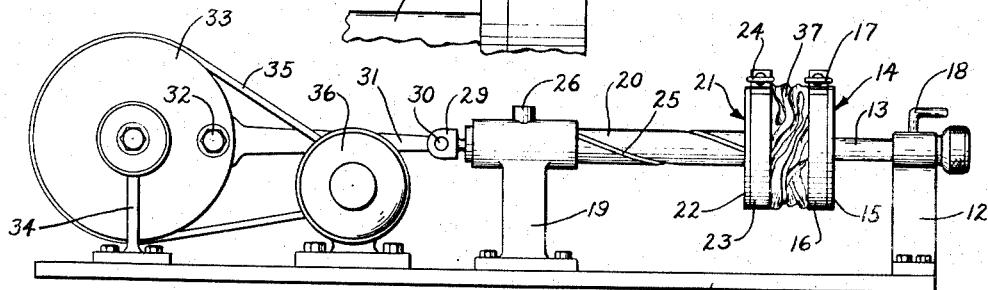
Fig. 2 is a front elevational view of Fig. 1 showing the specimen in crushed position.

There is shown a base 11 on which is mounted a support 12 in the top of which is mounted for sliding movement rod 13 of a head 14 that includes a cylindrical drum 15 and a surrounding band 16 adapted to be locked against drum 15 by screw 17. A lock screw 18 is adapted to secure rod 13 in selected position in the top of support 12. It is also possible to apply a constant resistance to head 14 by means of springs or hydraulic loading rather than holding it stationary by means of a set screw.

Mounted on base 11 in spaced relation from support 12, is a second support 19 in the top of which is mounted for sliding movement rod 20 of a head 21 that includes a cylindrical drum 22 and a surrounding band 23 adapted to be locked against drum 22 by screw 24. Formed in the outside of rod 20 is a spiral groove 25 into which extends a pin 26 mounted in top of support 19. The groove 25 can be formed to produce simple harmonic motion or can be formed to produce a compound or complex motion such as a combined twist and push followed by a straight push.

The periphery of each of drums 15 and 22 is beveled at 27. Each of drums 15 and 22 can be provided with a number of holes 28 throughout or suitable attachments used to test the specimen under internal pressure or for subjecting the specimen to a test atmosphere of choice such as oxygen or hydrocarbon fluids.

On the end of rod 20 remote from head 21 is a swivel bracket 29 having a pin 30 upon which is rotatably mounted one end of link 31. The other end of link 31 is rotatably mounted upon a pin 32 on pulley 33 that is supported for rotation by a bearing block 34 secured to base 11. Pulley 33 is rotated by a belt 35 driven by a motor 36 mounted on base 11. The test specimen 37 is mounted at its opposite ends between heads 14 and 21.

In operation specimen 37 is mounted on the testing machine with heads 14 and 21 in retracted position as shown in Fig. 1. One end of the specimen 37 is attached to head 14. The opposite end of specimen 37 is mounted similarly to head 21. Motor 36 is started and through belt 35 turns pulley 33 to cause link 31 to reciprocate rod 20 or direct gearing may be used. By the action of pin 26 in groove 25, rod 20 and head 21 rotate during movement thereof toward and away from head 14. Movement of head 21 toward and away from head 14 together with simultaneous rotation of head 21 causes specimen 37 to be alternately crushed and twisted followed by stretching and untwisting.

Obviously many modifications and variations of the present invention are possible in light of the above teachings. It is therefore to be understood that within the scope of the appended claims the invention may be practiced otherwise than as specifically described.

The tested specimen may be evaluated by subjection to subsequent tests such as water-vapor permeability, greaseproofness, or physical tests or may be visually examined.

The machine described can be used in conjunction with various temperatures or humidities or the specimens may be previously conditioned.

We claim:

1. A testing machine comprising a base, first support means on said base, first clamp means including a rod slidably mounted on the first support means, means for locking said rod in selected position, second support means, second clamp means including a rod slidably mounted on the second support means for movement toward and away from the first clamp means, a spiral groove in one of the second means, and a pin on the other of the second means, said pin extending into the groove to rotate the second clamp during movement toward and away from the first clamp.

2. A testing machine comprising a base, first support means on said base, first clamp means including a rod slidably mounted on the first support means, means for locking said rod in selected position, second support means, second clamp means including a rod slidably mounted on the second support means for movement toward and away from the first clamp means, a spiral groove in one of the second means, a pin on the other such second means, said pin extending into the groove to rotate the second clamp during movement toward and away from the first clamp, and means for reciprocating the second clamp means.

3. A testing machine comprising a base, first support means on said base, first clamp means including a rod slidably mounted on the first support means, means for locking said rod in selected position, second support means, second clamp means including a rod slidably mounted on the second support means for movement toward and away from the first clamp means, each of said clamps including a cylindrical drum and a locking band around the drum adapted to lock a specimen to be tested against the drum, a spiral groove in one of the second means, a pin on the other second means, said pin extending into the groove to rotate the second clamp during movement toward and away from the first clamp, and means for reciprocating the second clamp.

4. A specimen testing machine comprising, in combination, a base, first support means on the base, first clamp means carried by the first support means, second support means on the base, second clamp means including a rod slidably mounted on the second support means for providing movement of the second clamp means toward and away from the first clamp means, there being a spiral groove in one of the second means, and a normally fixed pin on the other of the second means, said pin entering the groove and reacting therewith to rotate the second clamp means in one direction when moved toward the first clamp means and to rotate the second clamp means in the opposite direction when moved away from the first clamp means.

5. The specimen testing machine as defined in claim 4 in which each clamp means comprises a drum and a band concentrically related to the drum and movable toward the drum to clamp a specimen to be tested therebetween.

6. In a testing machine, a pair of clamps for engaging and holding a specimen of material to be tested, a base, and a separate support for each clamp mounted on the base and positioning the clamps in spaced apart opposed relationship, one of said supports having a bearing for providing rotation and axial movement of its respective clamp relative to the other clamp on an axis common to both, drive means for reciprocating said last mentioned clamp on said common axis and alternately toward and away from the other clamp, and means coacting between the reciprocating clamp and its support and operable to cause the clamp to rotate in one direction when moved toward the other clamp and to rotate in the opposite direction when moved away from the other clamp.

7. The invention described in claim 6 characterized by the provision of means for adjusting one of said clamps relative to the other clamps to vary the initial spacing therebetween.

8. The invention described in claim 6 wherein each clamp comprises a drum coaxial with said common axis and a band conforming substantially to the curvature of the drum and capable of being pressed against the drum to hold a specimen to be tested therebetween.

9. In a testing machine, a pair of clamps for engaging and holding a specimen of material to be tested, a base, a separate support for each clamp mounted on the base and positioning the clamps in spaced apart opposed relation on a common axis, means journaling one of the clamps on its respective support for rotation about said axis, means mounting one of said clamps on its respective support for bodily movement along said axis, drive means connected to said bodily movable clamp and operable to repeatedly reciprocate the clamp in a uniform manner along said axis toward and away from the other clamp, and means operatively connecting said drive means with said rotatable clamp and causing the clamp to rotate alternately in one direction and in the opposite direction in timed relation to the reciprocating strokes imparted by the drive means.

J. HARTLEY BOWEN, Jr.
PHILIP A. GELBER.

References Cited in the file of this patent

UNITED STATES PATENTS

| Number | Name | Date |
|---|---|---|
| 1,608,067 | Hull | Nov. 23, 1926 |
| 1,843,074 | Abbott | Jan. 26, 1932 |
| 2,048,314 | Allen | July 21, 1936 |

FOREIGN PATENTS

| Number | Country | Date |
|---|---|---|
| 700,171 | France | Dec. 22, 1930 |